United States Patent [19]
Itakura et al.

[11] Patent Number: 5,859,813
[45] Date of Patent: Jan. 12, 1999

[54] MAGNETO-OPTICAL RECORDING METHOD AND APPARATUS TO BE USED IN THE METHOD

[75] Inventors: Akihiro Itakura; Haruhiko Izumi, both of Kawasaki, Japan

[73] Assignee: Fujitsu Limited, Kawasaki, Japan

[21] Appl. No.: 963,986

[22] Filed: Nov. 4, 1997

Related U.S. Application Data

[63] Continuation of Ser. No. 632,837, Apr. 16, 1996, abandoned.

[30] Foreign Application Priority Data

Sep. 19, 1995 [JP] Japan ..................... 7-240231

[51] Int. Cl.$^6$ ..................................... G11B 7/00
[52] U.S. Cl. ................... 369/13; 369/116; 369/54
[58] Field of Search ............... 369/13, 116, 109, 369/54, 58, 47, 48, 49

[56] References Cited

U.S. PATENT DOCUMENTS 5,457,666  10/1995  Toda et al. .................. 369/116 X
5,459,701  10/1995  Tokita et al. ................. 369/116 X
5,469,422  11/1995  Sohmuta ..................... 369/116 X

FOREIGN PATENT DOCUMENTS 5-290437  11/1993  Japan .

OTHER PUBLICATIONS

Jpn. J. Appl. Phys. vol. 31, "M. Kaneko et al".

Primary Examiner—Muhammad N. Edun
Attorney, Agent, or Firm—Greer, Burns, & Crain, Ltd.

[57] ABSTRACT

The invention provides magneto-optical recording method and apparatus, in which a space area on a magneto-optical recording medium is irradiated with a beam in the form of a pulse train in which a bottom power and an assist power are alternately repeated, so as to rapidly change the temperature at the front edge of a recording mark, thereby preventing jitter from increasing.

9 Claims, 7 Drawing Sheets

MAGNETO-OPTICAL RECORDING METHOD AND APPARATUS TO BE USED IN THE METHOD

This application is a continuation of application Ser. No. 08/632,837 filed on Apr. 16, 1996 now abandoned.

BACKGROUND OF THE INVENTION

1. Field of the Invention

The present invention relates to a magneto-optical recording method for recording data with a large capacity by increasing a recording density, and an apparatus to be used in the recording method.

2. Description of Related Art

Generally, information is recorded in a magneto-optical disk in the following manner: A laser beam is converged by a lens, so as to change its intensity in accordance with the information to be recorded. The magnetization direction in an area irradiated with the laser beam is changed by applying an external magnetic field, thereby forming an inverted magnetic domain in which the information is recorded. The information recorded in the magneto-optical disk is reproduced by irradiating the surface of the disk with a laser beam weaker than that used for recording the information so as to detect the rotation of a plane of polarization caused by a difference in the magnetization direction on the disk.

Recently, there are increasing demands for a larger capacity and a higher recording density of such a magneto-optical disk. Various methods for increasing the capacity and density of the magneto-optical disk are known, such as a method for increasing a recording track density by decreasing a track pitch; a mark edge recording method in which information is included in an edge portion of an inverted magnetic domain; a land/groove recording method in which recording marks are formed in respective land and groove portions; and a method using an MSR (magnetic super-resolution) medium which is recently developed as a novel magneto-optical disk.

In the mark edge recording method among these known methods, the front and back edges of a recording mark correspond to information of "1". This method is set against a pit position recording method in which the presence and the absence of a recording mark respectively correspond to information of "1" and "0". In comparison with the pit position recording method, the mark edge recording method can attain remarkably high density recording.

The mark edge recording method is thus effective in high density recording, but it is necessary to form a recording mark, that is, an inverted magnetic domain, in a position and a length accurately according to data to be recorded. Therefore, power control of a used beam such as a laser beam and timing control of beam irradiation are significant factors in this method.

When a power of a laser beam, that is, a beam power, is simply changed in accordance with data to be recorded without taking a thermal effect of the laser beam on a recording face of the magneto-optical disk into consideration, the relationship among the data to be recorded, the beam power, temperature distribution and resultant recording marks is obtained as is shown in FIG. 1.

FIG. 1 is a waveform diagram showing the relationship among the data to be recorded, the beam power adopted for recording, the temperature distribution on the recording face of the magneto-optical disk and the recording marks formed on the recording face of the magneto-optical disk obtained by a conventional magneto-optical recording method.

As is obvious from FIG. 1, in accordance with the data to be recorded, the beam power rises from a bottom power $P_b$ to a writing power $P_w$ simultaneously with the rise of the data, is retained at a high level while the data is being at a high level, and falls from the writing power $P_w$ to the bottom power $P_b$ simultaneously with the fall of the data. Thus, the beam power is shown as a rectangular waveform.

As a result, the temperature distribution on the recording face of the magneto-optical disk increases with time. When a long recording mark is to be formed, the recording mark is formed in the shape of a teardrop and the back edge of the mark is shifted as shown in FIG. 1 due to stored heat. When a space between adjacent recording marks is small, the front edge of the latter mark is shifted due to heat interference caused by the former mark.

As a countermeasure against this problem, Japanese Patent Application Laid-Open No. 5-290437 (1993) discloses a multi-pulse recording method for suppressing the shift caused by such stored heat and heat interference.

This publication describes a technique for changing the power of a laser beam in three stages of a writing power $P_w$, an assist power $P_a$ for warm-up and a bottom power $P_b$ which is the lowest in a data recording operation on a magneto-optical disk.

FIG. 2 is a waveform diagram for showing the relationship among the data to be recorded, the beam power, the temperature distribution on the recording face of the magneto-optical disk and resultant recording marks obtained by this technique.

As is shown in FIG. 2, in an area where a recording mark is to be formed (hereinafter referred to as a recording mark area), the beam power rises from the assist power $P_a$ to the writing power $P_w$ simultaneously with the rise of the data to be recorded, then is retained at this level for a predetermined period of time, and falls from the writing power $P_w$ to the assist power $P_a$. Thereafter, the beam is emitted in the form of a pulse train in which the assist power $P_a$ and the writing power $P_w$ are alternately repeated in accordance with a length of the data to be recorded.

Prior to the fall of the data, the beam power falls from the writing power $P_w$ to the bottom power $P_b$, and is retained at this level until the fall of the data. After irradiating an area between the recording marks where a space is to be formed (hereinafter referred to as a space area) for a predetermined period of time, the beam power returns from the bottom power $P_b$ to the assist power $P_a$.

In the space area, the beam power is retained at the assist power $P_a$, and the aforementioned pattern is repeated correspondingly to the rise of subsequent data. As a result, the temperature distribution on the magneto-optical disk substantially corresponds to the level of the data, i.e. high or low, as is shown in FIG. 2, and the recording marks are formed in lengths in accordance with the data to be recorded as is shown in FIG. 2.

In this manner, in the recording mark area, the beam is emitted in a pulse-like manner in which the writing power $P_w$ and the assist power $P_a$ are alternately repeated, thereby suppressing heat from being stored on the magneto-optical disk. Around the back edge of the recording mark area, the beam power is changed to the bottom power $P_b$, thereby conducting a heat cut-off process. In the space area, the beam power is returned to the assist power $P_a$ and retained at this level, so that a temperature change due to the heat interference caused by forming the previous recording mark is balanced with warm-up temperature increase caused by the assist power $P_a$. Thus, the temperature distribution in the space area is made constant.

As a result, regardless of the length of the space area, the temperature at the front edge of the latter recording mark is made constant, thereby suppressing the front edge of this recording mark from being shifted by the heat interference.

In such a conventional multi-pulse recording method, the shift of the edge of a recording mark can be suppressed as compared with the method in which the beam power is changed in the rectangular waveform as shown in FIG. 1. However, when a recorded pattern is actually reproduced, so-called jitter, which indicates the degree of variation in the position of an edge with respect to a reproducing clock as a basis of a reproducing signal, is disadvantageously large.

The jitter becomes large for the following reason:

The jitter is considered to be caused by various kinds of noises such as a laser diode (LD) noise, a noise due to the variation in the sensitivity of a disk and a circuit noise. A mechanism of jitter occurrence in data recording is generally considered as follows:

In either of a recording mark area and a space area, the beam is continuously emitted with the assist power $P_a$ for warm-up, and hence the temperature at the recording face of the magneto-optical disk is increased. As a result, a difference t between the writing power $P_w$ and the assist power $P_a$ becomes small, so as to make gentle the temperature change at the front edge of the recording mark.

When the temperature change becomes gentle, the variation in the temperature distribution due to the variation in the sensitivity of the magneto-optical disk is affected, thereby disturbing the position of the front edge of the recording mark and enlarging the jitter. In addition, the jitter is likely to be increased as the recording mark is smaller. This has been a serious obstacle to high density recording.

SUMMARY OF THE INVENTION

The present invention was devised to overcome the afore-mentioned problems, and the object is providing a magneto-optical recording method and apparatus in which the shift of the front edge of a recording mark and the increase of jitter can be suppressed by rapidly changing the temperature between a recording mark area and a previous space area.

The magneto-optical recording method of this invention, in which a recording mark corresponding to data to be recorded is formed on a magneto-optical recording medium, comprises the steps of irradiating a recording mark area with a beam in the form of a pulse train in which different first and second writing powers are alternately repeated, and irradiating a space area between two recording mark areas with a beam in the form of a pulse train in which a bottom power and an assist power stronger than the bottom power are alternately repeated.

Accordingly, in the recording mark area, the beam is emitted as the pulse train having two levels of the first and second writing powers $P_{w1}$ and $P_{w2}$ ($P_{w1} > P_{w2}$), and in the space area, the beam is emitted as the pulse train having other two levels of the assist power $P_a$ and the bottom power $P_b$ ($P_a > P_b$). As a result, the temperature distribution in the space area on the magneto-optical recording medium can be finely controlled. Thus, the temperature distribution in the space area can be retained at a low and stable level, and hence, it is possible to rapidly change the temperature from the space area to the recording mark area, thereby suppressing the edge shift and the jitter.

In one aspect of the present magneto-optical recording method, the space area is irradiated with the beam having the bottom power for an initial predetermined period of time, and then, the space area is irradiated with the beam in the form of the pulse train in which the assist power and the bottom power are alternately repeated.

Therefore, by retaining the beam power at the bottom power $P_b$ for the predetermined period of time, the warm-up heat generated around the back edge of the recording mark is released, so that the temperature distribution in the space area can be rapidly retained at a low and constant level.

In another aspect of the present magneto-optical recording method, the space area is irradiated with the beam having the assist power for an initial predetermined period of time, and then, the space area is irradiated with the beam in the form of the pulse train in which the bottom power and the assist power are alternately repeated.

Therefore, by retaining the beam power at the assist power $P_a$ for the predetermined period of time, the heat amount for warm-up can be rapidly recovered, so that the temperature distribution in the space area can be rapidly retained at a low and constant level.

Alternatively, the magneto-optical recording apparatus of this invention, in which data to be recorded are recorded on a magneto-optical recording medium by irradiating the magneto-optical recording medium with a beam in accordance with the data, comprises a light source for emitting a beam irradiating the magneto-optical recording medium; a plurality of current sources for supplying different constant currents to the light source; a light source driving unit for controlling the light source so as to emit the beam having different powers on the basis of the currents supplied by the current sources; a plurality of switching units respectively interposed between the light source driving unit and the current sources; and a control signal generator for outputting a signal corresponding to the data to be recorded to the switching units so as to turn on/off the switching units.

Accordingly, the currents from the plural current sources for supplying different constant currents are supplied to the light source via the light source driving unit on the basis of the signal corresponding to the data to be recorded. Thus, the power of the light beam can be accurately controlled in accordance with the data.

The above and further objects and features of the invention will more fully be apparent from the following detailed description with accompanying drawings.

DETAILED DESCRIPTION OF THE INVENTION

The present invention will now be described referring to the accompanying drawings.

Figure 1:
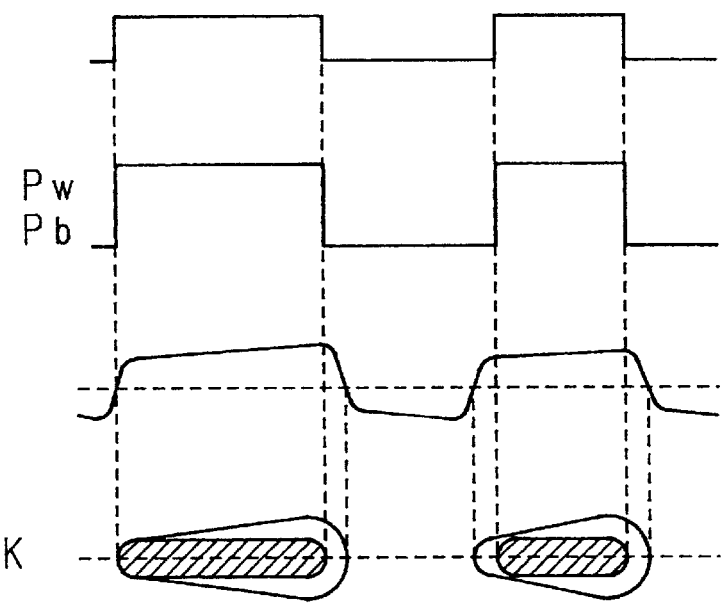
FIG. 1 is a waveform diagram for showing the relationship among data to be recorded, a beam power, temperature distribution and recording marks obtained by a conventional recording method.
Figure 2:
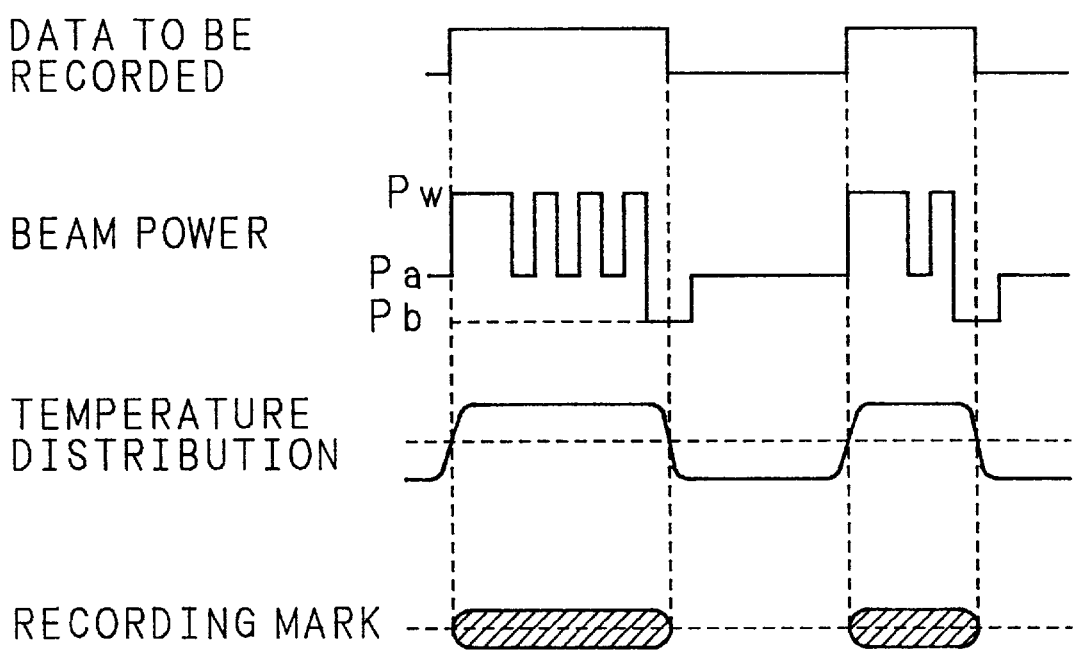
FIG. 2 is a waveform diagram for showing the relationship among data to be recorded, a beam power, temperature distribution and recording marks obtained by another conventional recording method.
Figure 3:
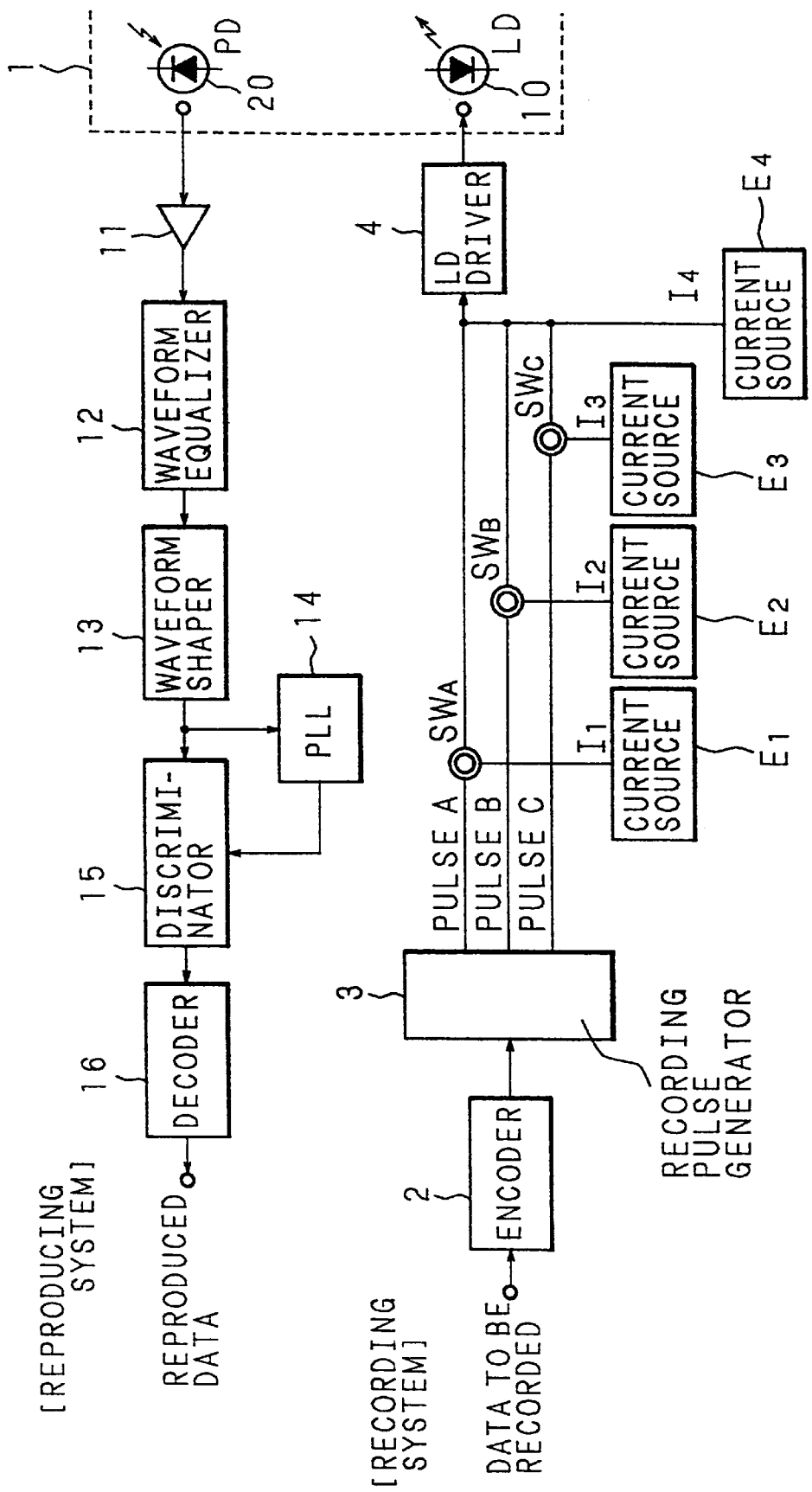
FIG. 3 is a block diagram for showing the configuration of a magneto-optical recording method and an apparatus to be used in the method according to the invention.

FIG. 3 is a block diagram showing the configuration of a magneto-optical recording method and an apparatus to be used in the method of the invention, in which a reference numeral 1 denotes an optical head.

The optical head 1 comprises a laser diode 10 and a photo diode 20. The laser diode 10 is supplied with an electric signal corresponding to data to be recorded, and emits a beam in response to the signal. The beam emitted by the laser diode 10 irradiates a magneto-optical disk not shown, thereby recording the data on the magneto-optical disk.

The photo diode 20 receives light reflected by the magneto-optical disk and outputs an electric signal corresponding to the reflected light.

The data to be recorded, which is supplied to the optical head 1, are first encoded by an encoder 2, and the obtained encoded signal is inputted to a recording pulse generator 3, that is, a control signal generator, described below. The recording pulse generator 3 outputs a pulse A, a pulse B and a pulse C on the basis of the inputted encoded signal, thereby selectively operating switches $SW_A$, $SW_B$ and $SW_C$.

A laser diode (LD) driver 4 is connected to current sources $E_1$, $E_2$, $E_3$ and $E_4$ in parallel. The switch $SW_A$ is interposed between the current source $E_1$ and the LD driver 4, the switch $SW_B$ is interposed between the current source $E_2$ and the LD driver 4, and the switch $SW_C$ is interposed between the current source $E_3$ and the LD driver 4.

The switches $SW_A$, $SW_B$ and $SW_C$ are in an on state when the pulses A, B and C supplied from the recording pulse generator 3 are at a high level, and are in an off state when the pulses are at a low level. When the switches are in an on state, the LD driver 4 is supplied with a sum of a current $I_1$, $I_2$ or $I_3$ from the current source $E_1$, $E_2$ or $E_3$ and a current $I_4$ from the current source $E_4$. When the switches are in an off state, the LD driver 4 is supplied with merely the current $I_4$ from the current source $E_4$.

The LD driver 4 operates the laser diode 10 on the basis of the four current values supplied thereto, thereby allowing the laser diode 10 to emit a laser beam with a power corresponding to the received current values.

The laser beam emitted by the laser diode 10 is converged on a lens system not shown and enters the surface of the magneto-optical disk, thereby recording the data on the magneto-optical disk.

In contrast, when recorded data are to be reproduced, reflected light of a laser beam having entered the magneto-optical disk from the laser diode 10 is received at the photo diode 20 of the optical head 1. The received reflected light is converted into an electric signal to be outputted to a reproducing amplifier 11. The signal passes through a waveform equalizer 12 and a waveform shaper 13. The thus obtained pulse signal is inputted to a PLL 14 and a discriminator 15. The PLL 14 outputs a periodic signal (that is, a signal synchronized with a basic period of the pulse signal) to the discriminator 15.

The discriminator 15 generates a detection code string on the basis of the pulse signal and the periodic signal, and a decoder 16 outputs a bit string of reproduced data based on the detection code string.

Figure 4:
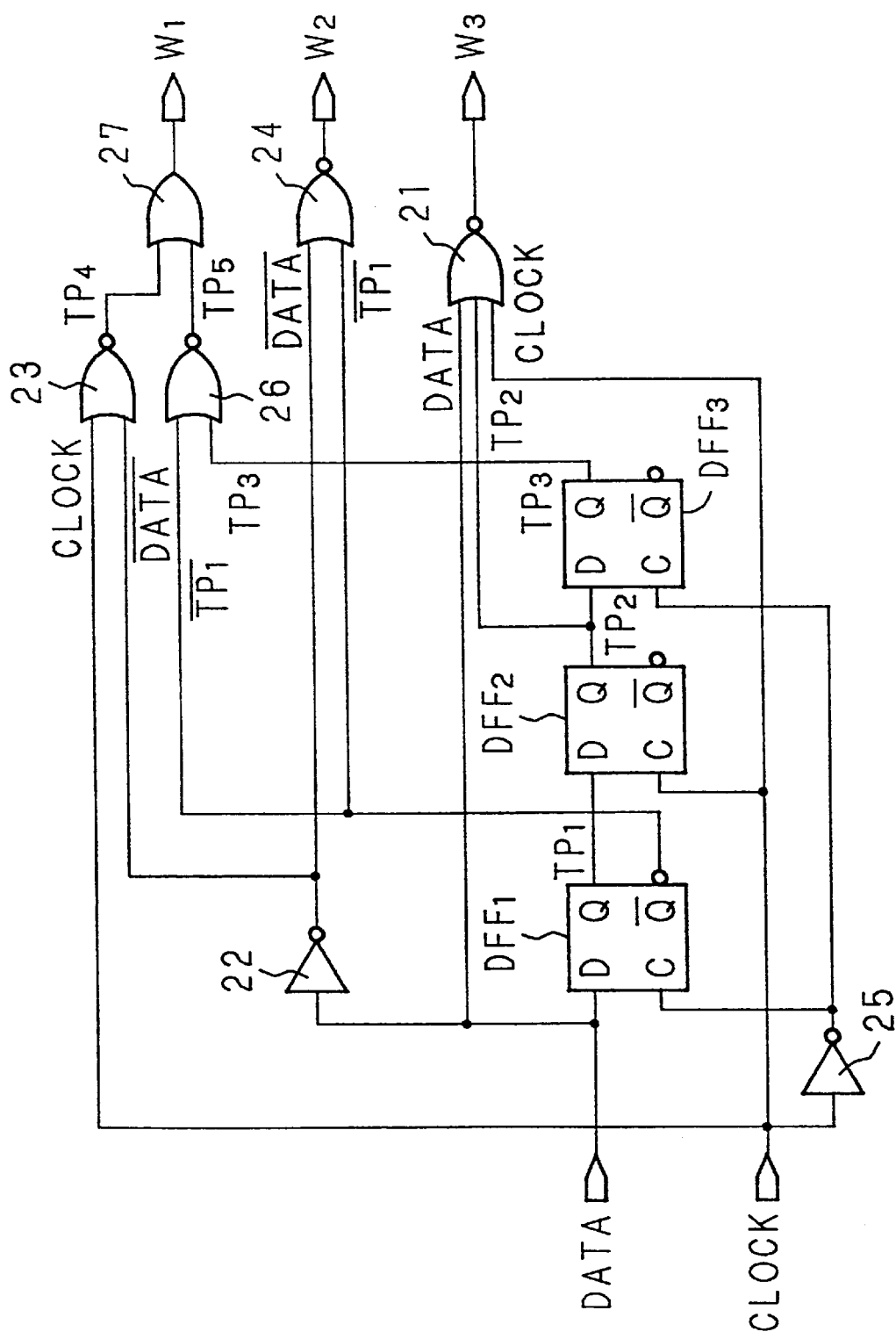
FIG. 4 is a circuit diagram of a recording pulse generator.

Now, the recording pulse generator 3 and the operation thereof will be described referring to FIGS. 4 and 5. FIG. 4 is a circuit diagram for showing the detailed configuration of the recording pulse generator 3, and FIG. 5 is a timing chart for the recording pulse generator 3.

Figure 5:
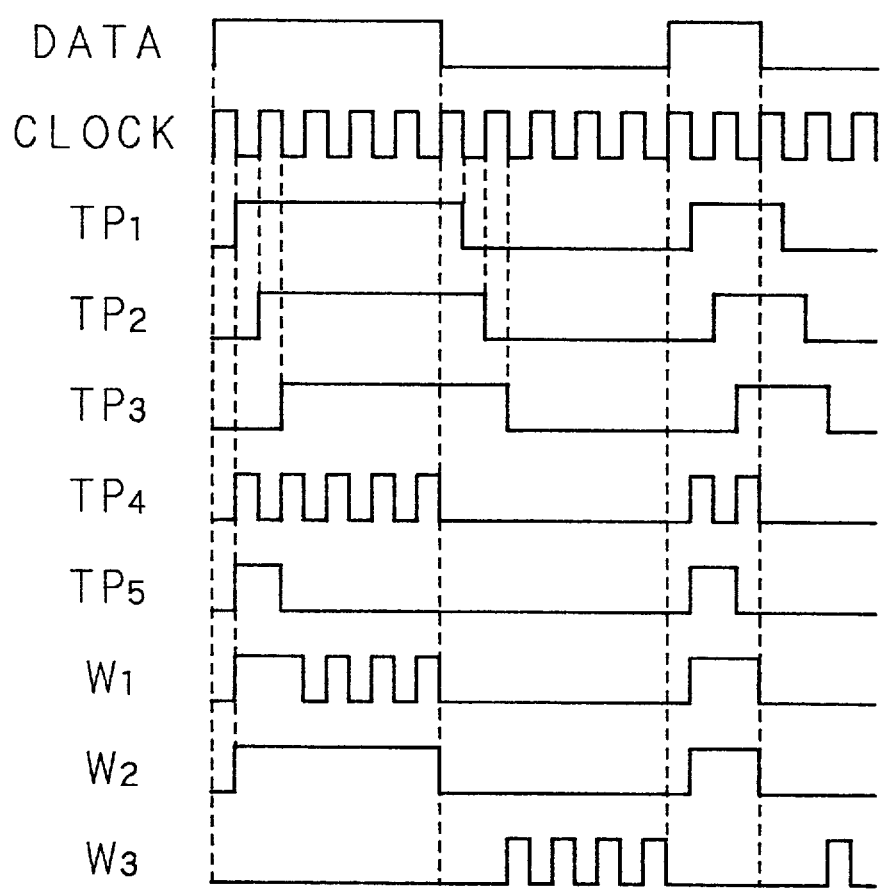
FIG. 5 is a timing chart for the recording pulse generator.

As is shown in FIG. 4, data to be recorded as is shown in FIG. 5 are supplied, via the encoder 2, to the D terminal of a flip-flop $DFF_1$ and one input terminal of a three-input NOR circuit 21 as well as to a NOT circuit 22 for inverting the data and supplying the inverted data to one input terminal of each of two-input NOR circuits 23 and 24.

On the other hand, a clock signal as is shown in FIG. 5 is supplied to the C terminal of a flip-flop $DFF_2$, another input terminal of the NOR circuit 21 and the other input terminal of the NOR circuit 23 as well as a NOT circuit 25 for supplying the inverted clock signal to the C terminals of the flip-flops $DFF_1$ and $DFF_3$.

An output signal $TP_1$ is outputted from the Q terminal of the flip-flop $DFF_1$ to the D terminal of the flip-flop $DFF_2$, and an output signal $TP_2$ is outputted from the Q terminal of the flip-flop $DFF_2$ to the D terminal of the flip-flop $DFF_3$ and the other input terminal of the NOR circuit 21.

An output signal $TP_3$ is outputted from the Q terminal of the flip-flop $DFF_3$ to one input terminal of a two-input NOR circuit 26, and an inverted output signal $/TP_1$ is outputted from the /Q terminal of the flip-flop $DFF_1$ to the other input terminals of the NOR circuits 24 and 26. The output signals $TP_1$, $TP_2$ and $TP_3$ are, as is shown in FIG. 5, signals in which the data are respectively delayed by a period of ½ T, that is, a half of a clock period T.

Output signals $TP_4$ and $TP_5$ as shown in FIG. 5 are outputted from the output terminals of the NOR circuits 23 and 26 to the input terminals of an OR circuit 27. The OR circuit 27 outputs an output signal $W_1$ from its output terminal, the NOR circuit 24 outputs an output signal $W_2$ from its output terminal and the NOR circuit 21 outputs an output signal $W_3$ from its output terminal to the switches $SW_A$, $SW_B$ and $SW_C$, respectively.

The switches $SW_A$, $SW_B$ and $SW_C$ are in an on state when the signals $W_1$, $W_2$ and $W_3$ are at a high level and are in an off state when the signals are at a low level as described above. Therefore, a signal to be inputted to the LD driver 4 and a beam power of the laser beam resultantly emitted by the laser diode 10 are in the forms shown in FIG. 6.

Among the output signals $W_1$, $W_2$ and $W_3$, the rise of the signals $W_1$ and $W_2$ is delayed by a period of ½ T from the rise of the data as is shown in FIG. 5. The output signal $W_1$ is retained at a high level for a period corresponding to ½ T, is returned to a low level, then becomes a pulse train and is retained as the pulse train while the data is at a high level. With regard to the output signal $W_2$, the rise is delayed by a period of ½ T from the rise of the data, and the fall accords with the fall of the data.

The output signal $W_3$ is retained at a low level for a period of ½ T from the fall of the data as is shown in FIG. 5, then becomes a pulse train and falls simultaneously with the rise of the data.

Figure 6:
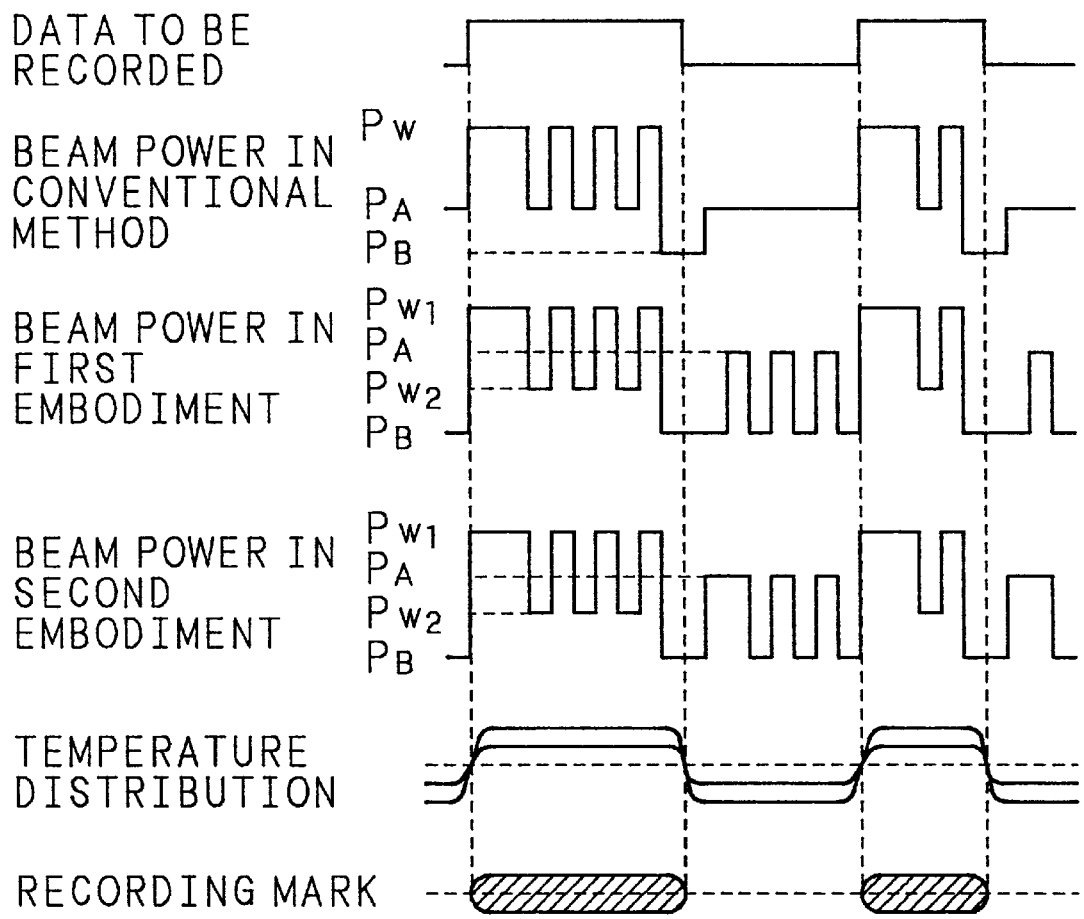
FIG. 6 is a waveform diagram for showing the relationship among data to be recorded, a beam power, temperature distribution and recording marks obtained in first and second embodiments of the invention.

FIG. 6 is a waveform diagram for showing the relationship among data to be recorded, a beam power adopted in the first embodiment, a beam power adopted in the second embodiment, temperature distribution on the recording face of a magneto-optical disk and resultant recording marks. Also the waveform of a beam power used in the conventional multi-pulse recording method is shown in FIG. 6 for reference.

Although the rise of the beam power is delayed from the rise of the data by a period of ½ T judging from the waveform of FIG. 5, the beam powers in the first and second embodiments are shown in FIG. 6 in such a manner that they rise simultaneously with the rise of the data similarly to the conventional beam power.

In a recording mark area in the first embodiment, the beam power rises from a bottom power $P_b$ to a first writing power $P_{w1}$ simultaneously with the rise of data to be recorded, and the beam power falls from the first writing power $P_{w1}$ to a second writing power $Pw_2$ ($P_{w1} > P_{w2}$) after a period of ½ T. Thereafter, the beam is emitted as a pulse train in which the second writing power $Pw_2$ and the first writing power $P_{w1}$ are alternately repeated in accordance with a clock period. Prior to the fall of the data by a period of ½ T, the beam power falls from the first writing power $P_{w1}$ to the bottom power $P_b$, which is retained until the beam starts to irradiate a space area.

In the space area, the beam power is retained at the bottom power $P_b$ for a period of T, and thereafter, the beam is emitted as a pulse train in which the bottom power $P_b$ and an assist power $P_a$ ($P_a > P_b$) are alternately repeated in accordance with the clock period.

With regard to subsequent data to be recorded, the same procedures are repeated. Specifically, the beam power rises from the bottom power $P_b$ to the first writing power $P_{w1}$ simultaneously with the rise of the data, and falls to the second writing power $P_{w2}$ after retaining the first writing power $P_{w1}$ for a period of ½ T. Then, the beam is emitted as the pulse train in which the second writing power $P_{w2}$ and the first writing power $P_{w1}$ are alternately repeated in accordance with the clock period. Prior to the fall of the data by a period of ½ T, the beam power falls from the first writing power $P_{w1}$ to the bottom power $P_b$.

The relationship in the intensity among the first and second beam powers $P_{w1}$ and $P_{w2}$, the assist power $P_a$ and the bottom power $P_b$ is $P_{w1} > P_a > P_{w2} > P_b$ in the above description. However, the relationship among them is not limited to this as far as $P_{w1} > P_{w2}$ and $P_a > P_b$. The relationship can be independently set, taking the characteristics of the magneto-optical disk, the other environmental conditions and the like into consideration.

In the second embodiment, in a process between a recording mark area and a space area, the beam power falls from the first writing power $P_{w1}$ to the bottom power $P_b$ prior to the fall of the data by a period of ½ T, and is retained at the bottom power $P_b$ until the beam starts to irradiate the space area. After a period of T, the beam power rises from the bottom power $P_b$ to the assist power $P_a$, which is retained for a period of T. Then, the beam power falls to the bottom power $P_b$ again, and thereafter, the beam is emitted as a pulse train in which the bottom power $P_b$ and the assist power $P_a$ are alternately repeated in accordance with the clock period. The waveform of the beam power in a recording mark area is substantially the same as that of the first embodiment.

FIG. 6 shows the temperature distribution on the surface of a magneto-optical disk obtained when data are recorded with the beam powers of the first embodiment and the conventional technique. In FIG. 6, a heavy line indicates the temperature distribution obtained by the beam power of the first embodiment and a light line indicates that obtained by the conventional beam power. As is obvious from FIG. 6, when the present method and apparatus are used, the temperature distribution in the space area is lower than that obtained by the conventional method. In addition, the temperature rapidly rises at the front edge of a subsequent recording mark area.

As a result, a recording mark accurately in accordance with data to be recorded can be formed as is shown in FIG. 6, in which the edge shift and the jitter are suppressed.

Figure 7:
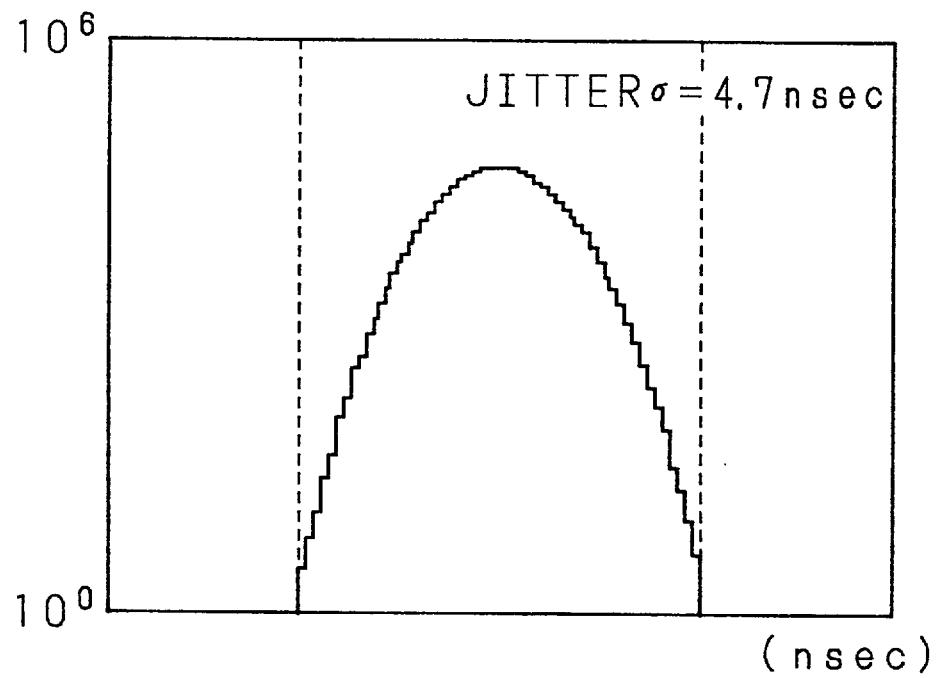
FIG. 7 is a graph showing jitter in the present method resulting from a comparison test.
Figure 8:
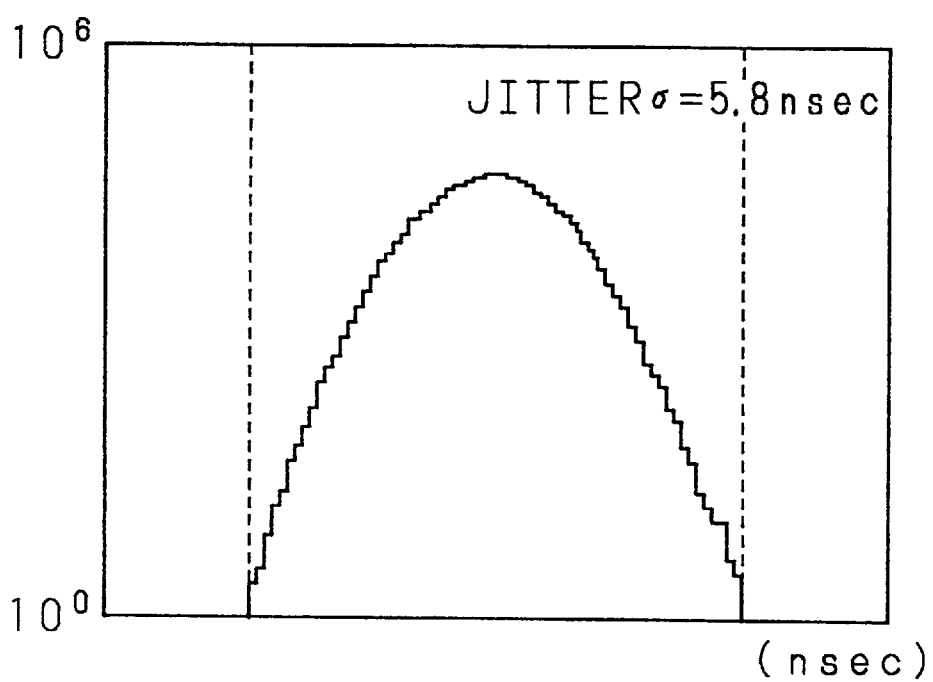
FIG. 8 is a graph showing jitter in a conventional method resulting from the comparison test.

FIG. 7 shows the distribution of the jitter caused in adopting the present method and apparatus, and FIG. 8 shows that caused in adopting the conventional method.

In obtaining the jitter distribution shown in FIGS. 7 and 8, a so-called magnetic super-resolution (MSR) medium having a film configuration described in a paper (Jpn. JAppl. Phys. 31 (1992), 568) is used for recording data with a mark length of 0.4 µm, with rotating the medium at a linear velocity of 9 m/sec. by the present method and the conventional method.

As a result, the jitter σ is found to be 4.7 nsec. in adopting the present method, and is 5.8 nsec. in adopting the conventional method. Thus, the jitter can be decreased by 1.8 nsec. in the present method.

In this manner, according to the present invention, when data are recorded on a magneto-optical recording medium, the beam irradiates a recording mark area and a space area with a beam power in the form of a pulse train in which two values are alternated. Therefore, the temperature in the space area can be finely controlled, so that the temperature in this area can be retained at a low and constant level regardless of the length of the area. As a result, the shift of the edge of the recording mark area can be suppressed and the jitter can be decreased.

Additionally, in accordance with the present invention, the beam power is retained at a bottom power for a predetermined period of time at the initial stage of irradiation of the space area, and then is changed into the form of the pulse train. Therefore, the heat interference in the previous recording mark area can be cut off, and the temperature in the space area can be retained at a low and stable level.

Alternatively, according to the present invention, the beam power is retained at an assist power for a predetermined period of time at the initial stage of irradiation of the space area, and then is changed into the form of the pulse train. Therefore, the temperature which has been decreased for forming the back edge of the previous recording mark can be rapidly recovered, and the temperature distribution thereafter can be retained at a low and stable level.

Furthermore, according to the present invention, current sources, which operates a light source so as to emit a beam with powers corresponding to pulses generated by a control signal generator, are selectively connected to the light source, so that the light source always supplies a stable output. Therefore, the power of the beam emitted by the light source can be accurately controlled. This makes contributions to the decrease of the edge shift and the jitter, so as to realize high density recording.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magneto-optical recording method by which a recording mark corresponding to data to be recorded is formed on a magneto-optical recording medium, comprising the steps of:

irradiating a recording mark area with a beam in the form of a pulse train in which a first pulse having a writing power $P_{w1}$ and a second pulse having a writing power $P_{w2}$ are alternatively repeated, wherein the first writing power $P_{w1}$ is larger than the second power $P_{w2}$, and irradiating a space area between two of the recording mark areas with a beam in the form of a pulse train in which a first pulse having a bottom power and a second pulse having an assist power stronger than the bottom power are alternately repeated.

2. The magneto-optical recording method according to claim 1, wherein, after the space area is irradiated with the beam having the bottom power for an initial predetermined period of time, the space area is irradiated with the beam in the form of the pulse train in which the assist power and the bottom power are alternately repeated.

3. The magneto-optical recording method according to claim 2, wherein the recording mark corresponds to the data to be recorded at front and back edges thereof.

4. The magneto-optical recording method according to claim 1, wherein, after the space area is irradiated with the beam having the assist power for an initial predetermined period of time, the space area is irradiated with the beam in the form of the pulse train in which the bottom power and the assist power are alternately repeated.

5. The magneto-optical recording method according to claim 4, wherein the recording mark corresponds to the data to be recorded at front and back edges thereof.

6. The magneto-optical recording method according to claim 1, wherein the recording mark corresponds to the data to be recorded at front and back edges thereof.

7. A magneto-optical recording apparatus for recording data to be recorded on a magneto-optical recording medium by irradiating the magneto-optical recording medium with a beam in accordance with the data to be recorded, comprising:

a light source for emitting the beam irradiating the magneto-optical recording medium;

a plurality of current sources for supplying different constant currents to the light source;

a light source driving unit for controlling the light source so as to emit the beam having different powers on the basis of the currents supplied by the current sources; wherein said light source driving unit irradiates a recording mark area with a first beam in the form of a pulse train in which a first pulse having a writing power $P_{w1}$ and a second pulse having a writing power $P_{w2}$ are alternately repeated, and the first writing power $P_{w1}$ is larger than the second power $P_{w2}$, and said light source irradiates a space area between two of the recording mark areas with a second beam in the form of a pulse train in which a first pulse having a bottom power and a second pulse having an assist power stronger than the bottom power are alternately repeated;

a plurality of switching units respectively interposed between the light source driving unit and the current sources; and a control signal generator for outputting a signal corresponding to the data to be recorded to the switching units so as to turn on/off the switching units.

8. A magneto-optical recording method by which a recording mark corresponding to data to be recorded is formed on a magneto-optical recording medium, comprising the steps of:

irradiating a recording mark area with a beam in the form of a pulse train in which a first writing power $P_{w1}$ and a second writing power $P_{w2}$ are alternately repeated, wherein the first writing power $P_{w1}$ is larger than the second power $P_{w2}$, and irradiating a space area between two of the recording mark areas with a beam in the form of a pulse train in which a bottom power and an assist power stronger than the bottom power are alternately repeated.

9. A magneto-optical recording apparatus for recording data to be recorded on a magneto-optical recording medium by irradiating the magneto-optical recording medium with a beam in accordance with the data to be recorded, comprising:

a light source for emitting the beam irradiating the magneto-optical recording medium;

a plurality of current sources for supplying different constant currents to the light source;

a light source driving unit for controlling the light source so as to emit the beam having different powers on the basis of the currents supplied by the current sources;

wherein said light source driving unit irradiates a recording mark area with a first beam in the form of a pulse train in which a first writing power $P_{w1}$ and a second writing power $P_{w2}$ are alternately repeated, and the first writing power $P_{w1}$ is larger than the second writing power $P_{w2}$, and said light source irradiates a space area between two of the recording mark areas with a second beam in the form of a pulse train in which a bottom power and an assist power stronger than the bottom power are alternately repeated;

a plurality of switching units respectively interposed between the light source driving unit and the current sources; and a control signal generator for outputting a signal corresponding to the data to be recorded to the switching units so as to turn on/off the switching units.

* * * * *